United States Patent
Machida

(10) Patent No.: US 8,891,091 B2
(45) Date of Patent: Nov. 18, 2014

(54) IMAGE PROCESSING APPARATUS, IMAGE PROCESSING CONTROL METHOD AND COMPUTER-READABLE STORAGE MEDIUM

(75) Inventor: Tatsushi Machida, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 1345 days.

(21) Appl. No.: 12/127,145

(22) Filed: May 27, 2008

(65) Prior Publication Data
US 2009/0009821 A1 Jan. 8, 2009

(30) Foreign Application Priority Data
Jul. 5, 2007 (JP) ................................ 2007-177508

(51) Int. Cl.
H04N 1/40 (2006.01)
H04N 1/00 (2006.01)
H04N 1/32 (2006.01)
G06F 9/54 (2006.01)
G06F 9/50 (2006.01)

(52) U.S. Cl.
CPC ....... *H04N 1/32561* (2013.01); *H04N 1/00923* (2013.01); *H04N 1/00954* (2013.01); *H04N 1/00933* (2013.01); *G06F 9/544* (2013.01); *G06F 9/5038* (2013.01); *G06F 9/5044* (2013.01)
USPC ........................................................ 358/1.13

(58) Field of Classification Search
USPC ................. 358/1.16, 1.15; 710/30, 31, 33
See application file for complete search history.

(56) References Cited

U.S. PATENT DOCUMENTS

| 5,526,505 | A | 6/1996 | Ludwig |
| 6,629,161 | B2* | 9/2003 | Matsuki et al. ................. 710/22 |
| 7,502,129 | B2* | 3/2009 | Tohyama ..................... 358/1.13 |
| 2002/0022900 | A1* | 2/2002 | Honda .......................... 700/108 |
| 2003/0011821 | A1* | 1/2003 | Obata et al. .................. 358/1.16 |
| 2004/0187126 | A1 | 9/2004 | Yoshimura |
| 2004/0268083 | A1 | 12/2004 | Kanai et al. |
| 2005/0183091 | A1 | 8/2005 | Van Eijndhoven et al. |
| 2005/0268303 | A1 | 12/2005 | Anderson et al. |
| 2006/0028667 | A1 | 2/2006 | Saito |
| 2006/0095912 | A1 | 5/2006 | Wood-Gaines et al. |
| 2006/0101062 | A1 | 5/2006 | Godman et al. |
| 2006/0274971 | A1 | 12/2006 | Kumazawa et al. |
| 2007/0070439 | A1 | 3/2007 | Tone |
| 2007/0076246 | A1 | 4/2007 | Terada et al. |
| 2007/0133030 | A1 | 6/2007 | Kanamoto |
| 2008/0055621 | A1* | 3/2008 | Price et al. ................... 358/1.13 |

FOREIGN PATENT DOCUMENTS

| EP | 1 705 569 A | 9/2006 |
| JP | 08-305589 | 11/1996 |
| JP | 09-107462 | 4/1997 |
| JP | 2000-312327 | 11/2000 |

(Continued)

OTHER PUBLICATIONS

Extended European Search Report.

*Primary Examiner* — Mark Zimmerman
*Assistant Examiner* — Lawrence Wills
(74) *Attorney, Agent, or Firm* — IPUSA, PLLC

(57) ABSTRACT

An image processing apparatus has a plurality of processing parts configured to execute different processes with respect to image data, and an executing sequence determination part configured to determine an executing sequence of the processing parts based on conditions related to a requested image processing. The processing parts execute the processes according to the executing sequence.

12 Claims, 14 Drawing Sheets

(56) References Cited

FOREIGN PATENT DOCUMENTS

| JP | 2003-274110 | 9/2003 |
| JP | 2004-112585 | 4/2004 |
| JP | 2005-045487 | 2/2005 |
| JP | 2005-136787 | 5/2005 |
| JP | 2006-048537 | 2/2006 |
| JP | 2006-231854 | 9/2006 |
| JP | 2006-279177 | 10/2006 |
| JP | 2006-338501 | 12/2006 |
| JP | 2006-350843 | 12/2006 |
| JP | 2007-058600 | 3/2007 |
| JP | 2007-068012 | 3/2007 |
| JP | 2007-088522 | 4/2007 |
| WO | WO 01/61468 A | 8/2001 |

* cited by examiner

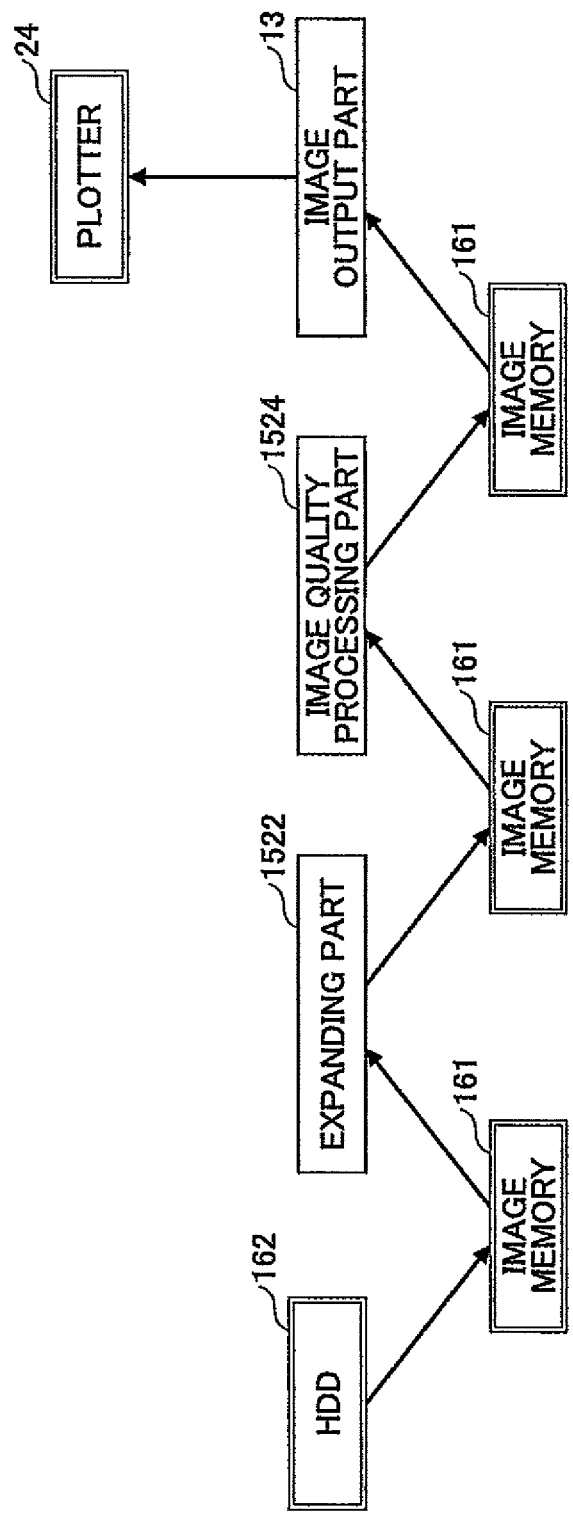

IMAGE PROCESSING APPARATUS, IMAGE PROCESSING CONTROL METHOD AND COMPUTER-READABLE STORAGE MEDIUM

BACKGROUND OF THE INVENTION

1. Field of the Invention

The present invention generally relates to image processing apparatuses, image processing control methods and computer-readable storage media, and more particularly to an image processing apparatus having a plurality of processing parts which execute different processes with respect to image data, an image processing control method to be implemented in such an image processing apparatus, and a computer-readable storage medium storing a program which causes a computer to execute such an image processing control method.

2. Description of the Related Art

Conventionally, there are image processing apparatuses which carry out image processings with respect to an input image input from an image input apparatus, such as a scanner, to convert the input image into an output image and to output the output image to an output apparatus. In such image processing apparatuses, the input image is subjected to an image processing to convert the input image into the output image that is output to the output apparatus, and to an image processing depending on output conditions desired by the user. The output image that is generated as a result of such image processings is output to the output apparatus.

The image processings described above are conventionally executed continuously by a plurality of image processing hardware parts (hereinafter referred to as "image processing modules") which execute different image processings.

However, an executing sequence of the image processing modules is fixed. Accordingly, in a case where there is an image processing module which does not need to be used depending on the specified output conditions, a complicated control is required to execute a through process which does not execute the image processing but passes through inside this image processing modules or, to execute a bypass process which bypasses this image processing module.

However, even if the through process or the bypass process is executed, the executing sequence is fixed with respect to the image processing modules which need to be used depending on the specified output conditions, and there is a problem in that the image processing lacks flexibility. In other words, results of the image processings may differ depending on the executing sequence of the image processings. For example, if two image processings are "enlarge" and "print characters" the characters are not subjected to the "enlarge" when the "print characters" is executed after the "enlarge", but the characters are subjected to the "enlarge" when the "enlarge" is executed after the "print characters".

The applicant is aware of a Japanese Laid-Open Patent Application No. 2006-231854 which proposes an image forming apparatus designed to increase the speed of a printing process without increasing the circuit scale.

SUMMARY OF THE INVENTION

Accordingly, it is a general object of the present invention to provide a novel and useful image processing apparatus, image processing control method and computer-readable storage medium, in which the problems described above are suppressed.

Another and more specific object of the present invention is to provide an image processing apparatus, an image processing control method and a computer-readable storage medium, which can control, with a high flexibility, an executing sequence of processing parts which execute different processes with respect to image data.

According to one aspect of the present invention, an image processing apparatus has a plurality of processing parts configured to execute different processes with respect to image data, and an executing sequence determination part (or means) configured to determine an executing sequence of the processing parts based on conditions related to a requested image processing, wherein the processing parts execute the processes according to the executing sequence.

The executing sequence determination part may select the selected processing parts which are to be used from among the plurality of processing parts based on the conditions related to the requested image processing, and determine the executing sequence of the selected processing parts.

Information indicating restrictions on the executing sequence of the selected processing parts may be stored in a first storage unit, and the executing sequence determination part may determine the executing sequence of the selected processing parts so as to satisfy the restrictions on the executing sequence.

Image data, generated as a processed result of a first processing part which is executed in the executing sequence, may be stored in the first storage unit, and a second processing part which is executed after the first processing part in the executing sequence may acquire the image data from the first storage unit as a processing target.

The second processing part may start acquiring the image data from the first storage unit when at least a portion of the image data is stored in the first storage unit from the first processing part.

Information indicating a relationship of processing speeds of the selected processing parts may be stored in a second storage unit, the second processing part may start acquiring the image data from the first storage unit when an amount of image data stored in the first storage unit from the first processing part reaches a predetermined amount which is determined by a relationship between processing speeds of the first processing part and the second processing part, based on the information stored in the second storage unit, and the first storage unit and the second storage unit may be formed by a single storage unit or different storage units.

According to one aspect of the present invention, it is possible to provide an image processing apparatus, an image processing control method and a computer-readable storage medium, which can control, with a high flexibility, the executing sequence of the processing parts which execute different processes with respect to the image data.

Other objects and further features of the present invention will be apparent from the following detailed description when read in conjunction with the accompanying drawings.

BRIEF DESCRIPTION OF THE DRAWINGS

FIG. 14 is a diagram showing a fourth example of the processing sequence of the image processing modules.

DESCRIPTION OF THE PREFERRED EMBODIMENTS

Figure 1:
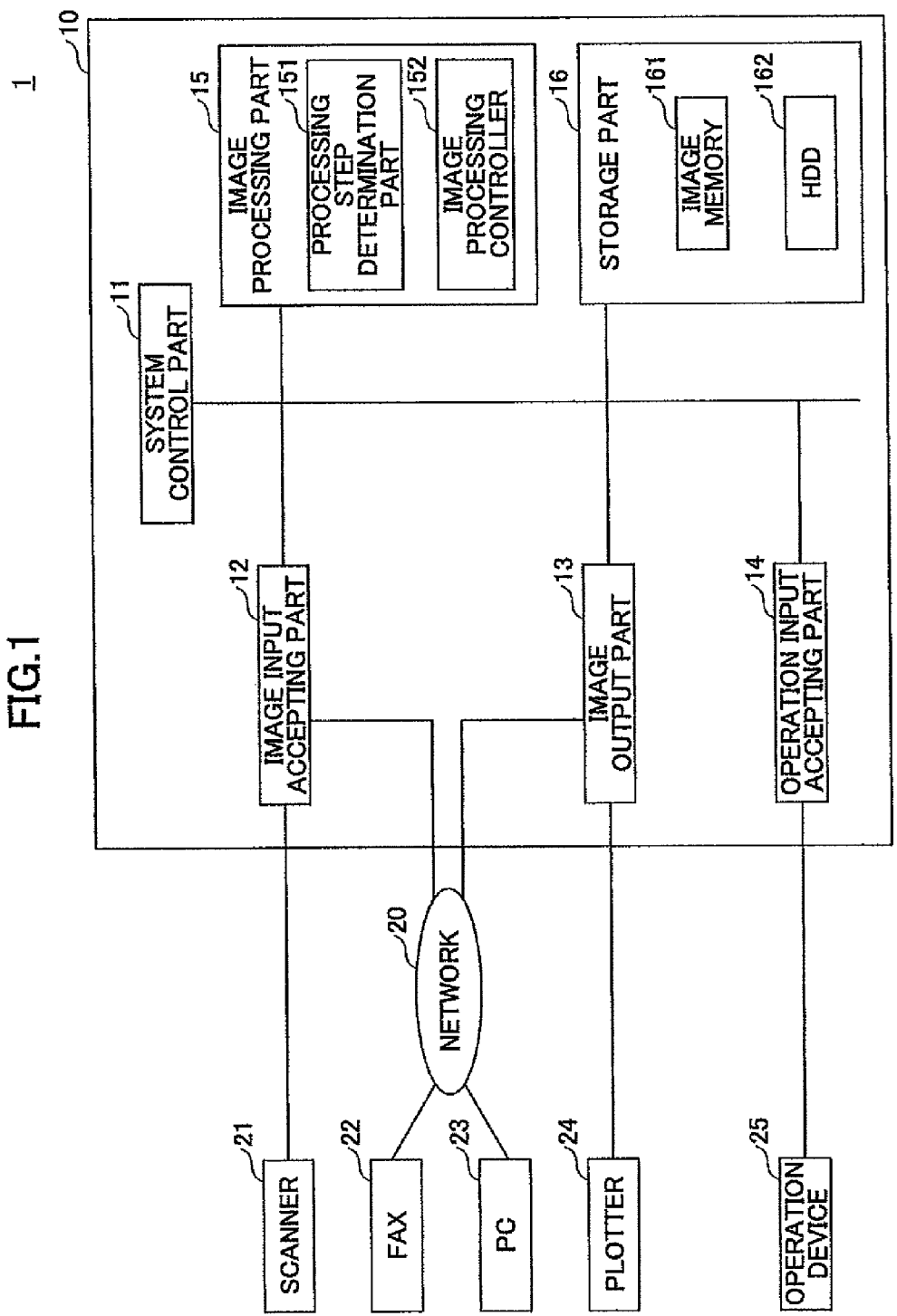
FIG. 1 is a system block diagram showing a structure of an image processing system in one embodiment of the present invention.

A description will be given of embodiments of the present invention, by referring to the drawings.

FIG. 1 is a system block diagram showing a structure of an image processing system in one embodiment of the present invention. An image processing system 1 includes an image processing apparatus 10, a scanner 21, a facsimile apparatus (FAX) 22, a Personal Computer (PC) 23, a plotter 24, an operation device 25 and the like that are connected as shown in FIG. 1.

The scanner 21 and the plotter 24 are connected to the image processing apparatus 10 via a cable such as a Universal Serial Bus (USB) table or, a network such as a Local Area Network (LAN). The scanner 21 functions as an image data input source with respect to the image processing apparatus 10. In other words, the scanner 21 reads an image from a document, and supplies the image data of the read image to the image processing apparatus 10.

The plotter 24 functions as an image data output destination with respect to the image processing apparatus 10. In other words, the plotter 24 prints the image data output from the image processing apparatus 10 onto a recording medium such as printing paper.

The facsimile apparatus 22 and the PC 23 are connected to the image processing apparatus 10 via a network 20, such as a LAN. The facsimile apparatus 22 and the PC 23 function as an image data input source or an image data output destination with respect to the image processing apparatus 10. In other words, the facsimile apparatus 22 sends the image data read from the document to the image processing apparatus 10 via the network 20, and prints the image data received from the image processing apparatus 10 via the network 20. In addition, the PC 23 sends image data stored in a storage unit (not shown) to the image processing apparatus 10 via the network 20, and stores the image data received from the image processing apparatus 10 via the network 20 in the storage unit. For example, the storage unit may be provided within the PC 23 or, connected externally to the PC 23.

The operation device 25 accepts operation instructions from the user, and notifies the operation instructions to the image processing apparatus 10. The operation instructions include setting of operation conditions with respect to the image data, for example. The operation device 25 includes various kinds of buttons or keys, such as a ten-key, start key, function keys and one-touch keys. One or more operations are instructed by a touch of the one-touch key.

The image processing apparatus 10 accepts the image data from the apparatus which functions as the image data input source, and carries out an image processing with respect to the image data depending on the operation conditions. Further, the image processing apparatus 10 outputs the image data generated as a result of this image processing to the apparatus which functions as the image data output destination.

In this embodiment, the image processing apparatus 10, the scanner 21, the facsimile apparatus 22, the plotter 24 and the operation device 25 of the image processing system 1 are separate (or different) apparatuses. However, the image processing apparatus 10, the scanner 21, the facsimile apparatus 22, the plotter 24 and the operation device 25 of the image processing system 1 may be provided within a single housing to form a Multi-Function Peripheral (MFP). The MFP is sometimes also referred to as a composite apparatus.

Next, a description will be given of the functions of the image processing apparatus 10. As shown in FIG. 1, the image processing apparatus 10 includes a system control part 11, an image input accepting part 12, an image output part 13, an operation input accepting part 14, an image processing part 15 and a storage part 16.

The system control part 11 is a software which functions when a Central Processing Unit (CPU) of the image processing apparatus 10 executes a program, and controls various parts of the image processing apparatus 10.

The image input accepting part 12, the image output part 13 and the operation input accepting part 14 include a hardware for communicating with respective connecting destinations, and a software for controlling the hardware.

The image input accepting part 12 controls the communication between the scanner 21 and the image processing apparatus 10 and the communication of the image processing apparatus 10 via the network 20, and accepts the input of the image data (that is, the input image) from the image data input source.

The image output part 13 controls the communication between the plotter 24 and the image processing apparatus 10 and the communication of the image processing apparatus 10 via the network 20, and sends to the image data output destination the image data (that is, the output image) obtained by subjecting the input image to the image processing.

The operation input accepting part 14 controls the communication between the operation device 25 and the image processing apparatus 10, and accepts the instruction related to the image processing, which is input by the user via the operation device 25.

The storage part 16 includes a storage unit (hardware) such as an image memory 161 and a Hard Disk Drive (HDD) 162, and a software for controlling the storage part 16. The storage part 16 stores the input image data (or input image) and the output image data (or output image), and temporarily stores intermediate image data (or intermediate images) which are generated during the image processing. The input image data and the output image data are stored in the storage part 16 by mainly using the HDD 162. On the other hand, the intermediate data are temporarily stored in the storage part 16 by mainly using the image memory 161. The HDD 162 also stores programs which cause the CPU of the image processing apparatus 10 to function as the system control part 11 and a processing step determination part 151 which will be described later.

The image processing part 15 carries out the image processing with respect to the input image data depending on the operation conditions, and generates the output image data. The image processing includes an image processing depending on a user's request such as a tone conversion, a magnification or reduction (or zoom) and a color conversion, and an image processing depending on the output apparatus (that is, the image data output destination), such as a format transformation of the image data and an image rotation. The image processing part 15 includes the processing step determination part 151 and an image processing controller 152. The image processing controller 152 includes a plurality of image processing hardware parts (hereinafter referred to as "image processing modules") which carry out different image processings. Hence, the image processing is carried out in the image processing controller 152.

The processing step determination part 151 includes a software which functions when the CPU of the image processing apparatus 10 executes a program, and controls the image processing of the image processing controller 152. More particularly, the processing step determination part 151 selects the image processing modules which are to be used depending on the operation conditions, and determines the executing sequence of the selected image processing modules. The processing step determination part 151 may select a single image processing module or, select a plurality of image processing modules. Furthermore, the processing step determination part 151 carries out a control so that the processes of the selected image processing modules are executed in the determined executing sequence.

Figure 2:
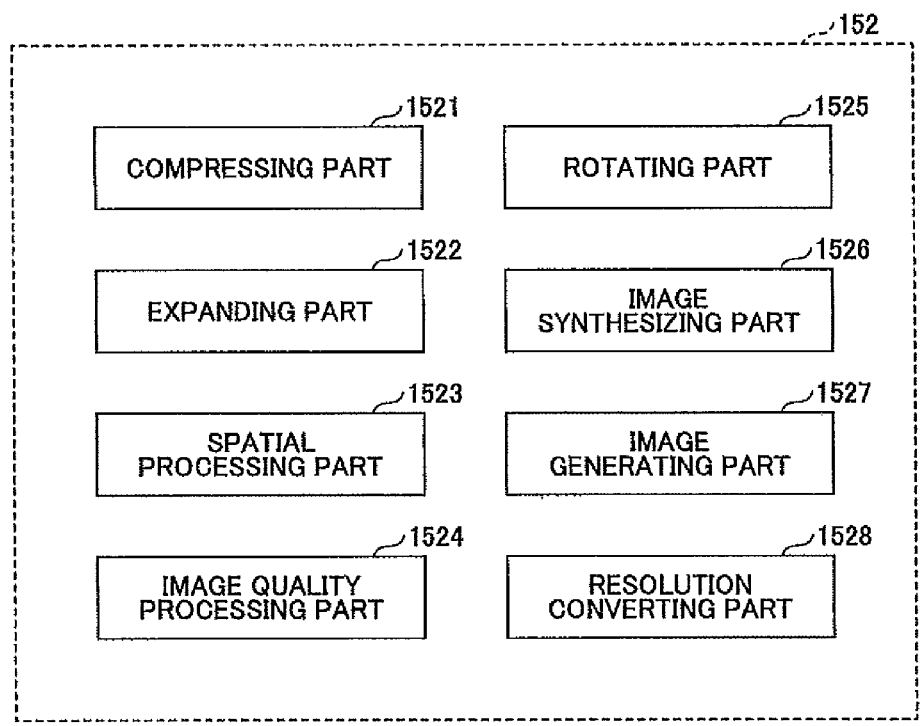
FIG. 2 is a diagram for explaining image processing modules included in an image processing controller.

Next, a more detailed description will be given of the image processing part 15. FIG. 2 is a diagram for explaining the image processing modules included in the image processing controller 152. In FIG. 2, the image processing controller 152 includes, as the image processing modules, a compressing part 1521, an expanding part 1522, a spatial processing part 1523, a picture quality processing part 1524, a rotating part 1525, an image synthesizing part 1526, an image generating part 1527 and a resolution converting part 1528.

The compressing part 1521 compresses non-compressed image data. The expanding part 1522 expands the compressed image data. Any known suitable compression and expansion techniques, such as the JPEG encoding technique, may be employed by the compressing part 1521 and the expanding part 1522.

The spatial processing part 1523 carries out a spatial image processing, such as a magnification or reduction of the image, addition or deletion of pixels, and a masking process. The deletion of the pixels reduces the image size by deleting the pixels. The masking process maintains the image size, but replaces the color of the pixel by a specific color such as white.

The picture quality processing part 1524 carries out an image processing that affects the picture quality, such as a color conversion and a gamma correction process. The rotating part 1525 rotates the image. The image synthesizing part 1526 synthesizes two or more images. The image generating part 1527 generates an image, such as a lattice pattern and a tint block pattern. The resolution converting part 1528 carries out a resolution conversion in accordance with (that is, suited for) the image data output destination.

Figure 3:
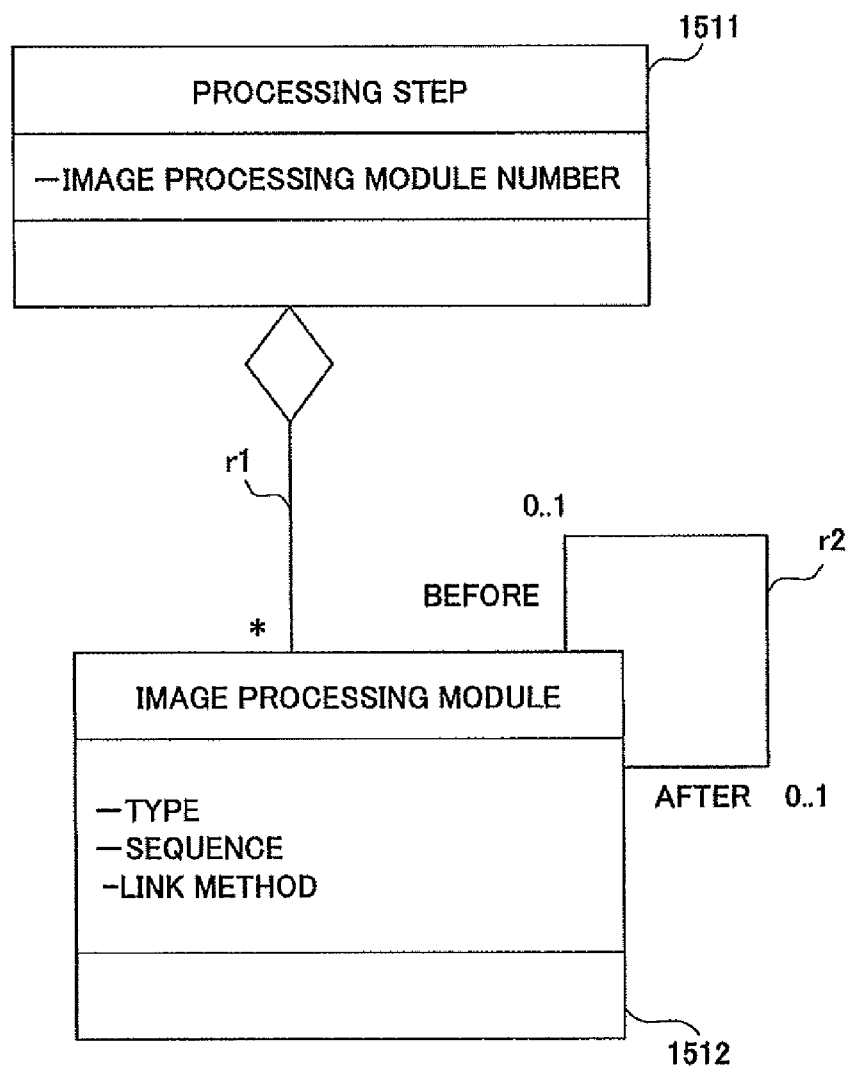
FIG. 3 is a class diagram for explaining a structure of a processing step determination part.

FIG. 3 is a class diagram for explaining a structure of the processing step determination part 151. The class diagram is in accordance with a representation method using a Unified Modeling Language (UML), which is a unified representation method of a program model in object oriented software development. In other words, two rectangles designated by reference numerals 1511 and 1512 represent a model class of an object having data and operation, although the illustration of the operation is omitted in FIG. 3 for the sake of convenience. A line connecting the rectangles indicate that a relationship exists between the classes presented by the rectangles. In a software system forming the processing step determination part 151, instances of the related classes mutually send and receive messages and carry out coordinated operations, to realize control of an image processing flow (that is, sequence of image processings). The methods of sending and receiving the messages and carrying out the coordinated operations are dependent upon the implementation. The instance of each class has a state, and carries out a predetermined operation dependent upon the state when a message is received from another instance.

As shown in FIG. 3, the processing step determination part 151 includes a processing step class 1511 and an image processing module class 1512.

The processing step class 1511 is implemented with functions such as selecting the image processing modules which are to be used depending on the operation conditions and the like, determining the executing sequence of the selected image processing modules, and controlling execution of the image processing modules in the determined executing sequence. In addition, one instance (that is, processing step object) of the processing step class 1511 exists for one processing step determination part 151. Further, the processing step class 1511 has an "image processing module number" attribute. The "image processing module number" attribute holds the number of image processing modules which are to be used.

The image processing module class 1512 represents one image processing module by one instance (that is, image processing module object) thereof. The image processing module class 1512 has a "type" attribute, a "sequence" attribute and a "link method" attribute. The "type" attribute holds the type of the image processing module corresponding to the instance. The "sequence" attribute holds the executing sequence of the image processing modules corresponding to the instances. The "link method" attribute will be described later.

The processing step class 1511 assembles the image processing module classes 1512 using a relation r1 by a 1:N multiplicity, where N is a natural number greater than or equal to two. Accordingly, one or more image processing module objects are assembled by one processing step object.

The image processing module class 1512 has a 1:1 relation r2 with respect to itself (image processing module class 1512). A role name at one end of the relation r2 is "before", and the role name at the other end of the relation r2 is "after". In other words, the relation r2 relates the image processing module objects according to the executing sequence of the image processing modules. The image processing object module corresponding to the image processing module having the preceding order in the executing sequence has the role name "before" in the relation r2. On the other hand, the image processing object module corresponding to the image processing module having the subsequent order in the executing sequence has the role name "after" in the relation r2.

Figure 4:
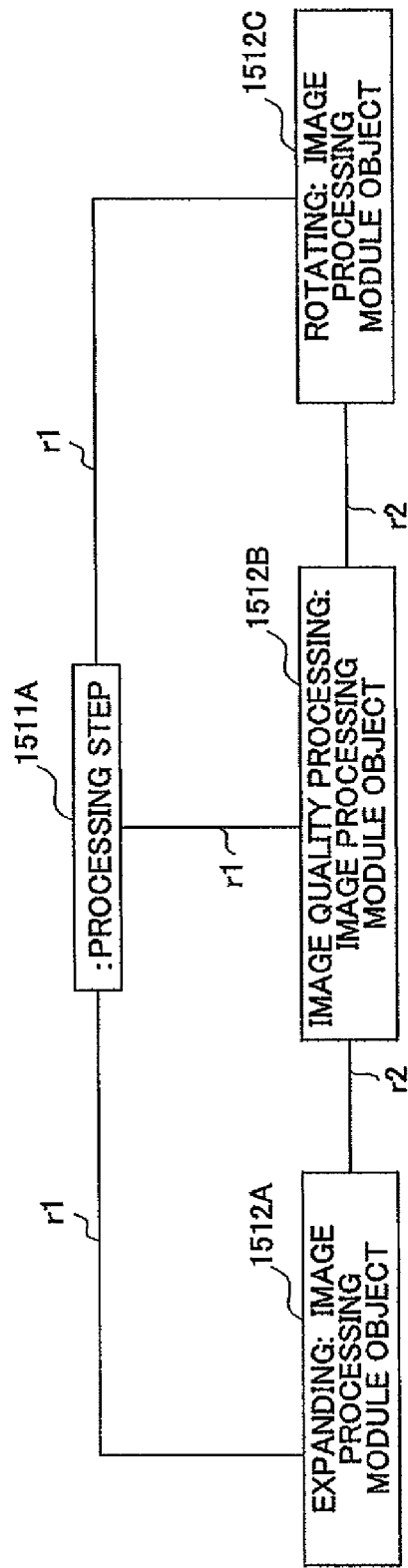
FIG. 4 is a diagram showing a structure of an object of the processing step determination part.

For example, a real entity shown in FIG. 4 is formed based on the class diagram shown in FIG. 3. FIG. 4 is a diagram showing a structure of the object of the processing step determination part 151. FIG. 4 shows a case where the image processings of the expanding part 1522, the image quality processing part 1524 and the rotating part 1525 are executed in this processing sequence.

As shown in FIG. 4, the expanding part 1522, the image quality processing part 1524 and the rotating part 1525 are formed by instancing into an expanding object 1512A, a picture quality processing object 1512B and a rotating object 1512C, as corresponding image processing module objects of the expanding part 1522, the image quality processing part 1524 and the rotating part 1525. Moreover, depending on the executing sequence of the expanding part 1522, the image quality processing part 1524 and the rotating part 1525, the corresponding image processing module objects 1512A, 1512B and 1512C are related by the relation r2.

In addition, each of the image processing module objects 1512A, 1512B and 1512C is related, by the relation r1, to a processing step object 1511A corresponding to the processing step class 1511. Accordingly, the processing step object 1511A can identify the image processing modules which are to be used, based on a value of the "type" attribute of the image processing module objects which are related by the relation r1. Moreover, the processing step object 1511A can identify the executing sequence of the image processing modules 1512A, 1512B and 1512C, based on the connection relationship of each of the image processing module objects by the relation r2. In other words, the object structure shown in FIG. 4 represents information for controlling the image processings by the image processing modules. In the following description, the information represented by the object structure shown in FIG. 4 will be referred to as "image processing control information".

Each object is generated in an arbitrary storage unit within the image processing apparatus 10, such as the image memory 161. Hence, information, such as the attribute and the relation, which is managed by the objects, can be stored in the image memory 151.

Figure 5:
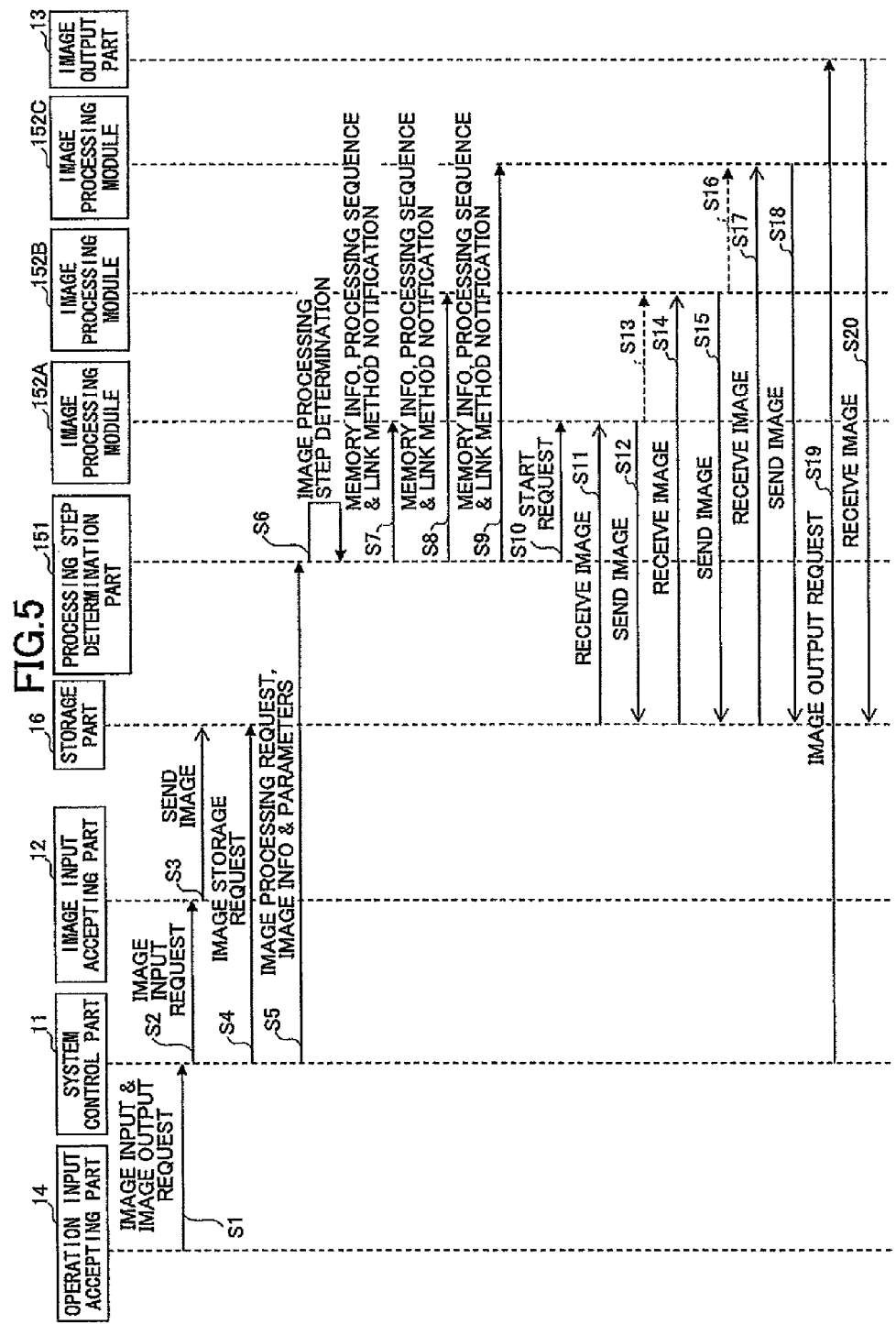
FIG. 5 is a sequence diagram for explaining a processing procedure of an image processing apparatus.

Next, a description will be given of a processing procedure of the image processing apparatus 10. FIG. 5 is a sequence diagram for explaining the processing procedure of the image processing apparatus 10.

When the user makes, via the operation device 25, an operation input that instructs input of the image and an operation input that instructs output of the image, the operation input accepting part 14 accepts the operation inputs from the operation device 25. For example, the operation input that instructs the input of the image sets the image data input source. In addition, the operation input that instructs the output of the image sets the image data output destination, and sets the operation conditions (or image data output conditions) related to the image processings with respect to the color mode and the tone, for example. The operation input accepting part 14 requests, with respect to the system control part 11, execution of the image input and the image output in accordance with the operation inputs (step S1).

The system control part 11 requests input of the image data to the image input accepting part 12 in response to the request from the operation input accepting part 14 (step S2). The image input accepting part 12 accepts input of the image data (input image) from the image data input source, such as the scanner 21, the facsimile machine 22 and the PC 23, which is specified by the operation input, and outputs the input image data to the storage part 16 (step S3).

Next, the system control part 11 requests storage (or saving) of the input image data output from the image input accepting part 12 into the storage part 16 (step S4). Thereafter, the system control part 11 outputs information related to the input image data (input image) that is the image processing target and image processing parameters that is specified as the image output conditions, with respect to the processing step determination part 151, and requests execution of an image processing in accordance with the parameters (step S5). For example, the information related to the input image data include the number of pixels, the number of gradation levels, the image format, and the like. For example, the image processing parameters include information indicating whether or not to carry out an expansion process, the expansion technique to be used when carrying out the expansion process, whether or not to carry out a tone adjusting process, the notch level that is used when carrying out the tone adjusting process, and the like.

The processing step determination part 151 selects the image processing modules which are to be used based on the image processing parameters, and determines the executing sequence of the selected image processing modules (step S6). This step S6 will be described later in more detail. As a result of the process of the step S6, image processing control information, which is represented by the object structure shown in FIG. 4, for example, is generated.

Next, the processing step determination part 151 identifies each image processing module which is to be used, based on the "type" attribute of the image processing module object related to the processing step object by the relation r1, and notifies memory information, processing sequence information and link method information (or attribute) in parallel to each image processing module which is to be used. FIG. 5 shows a case where an image processing module 152A, an image processing module 152B and an image processing module 152C are selected as the image processing modules which are to be used. The image processing modules 152A, 152B and 152C are generalized representations of each of the image processing modules shown in FIG. 2. Accordingly, the processing step determination part 151 notifies the memory information, the processing sequence information and the link method information in parallel to each of the image processing modules 152A, 152B and 152C (steps S7, S8 and S9). Notifying the memory information, the processing sequence information and the link method information "in parallel" to each of the image processing modules 152A, 152B and 152C means "not having to wait for the execution of the preceding image processing module in the executing sequence of the image processing modules to be completed". In addition, the notifying of the memory information, the processing sequence information and the link method information to the image processing module 152A, to the image processing module 152B and to the image processing module 152C may be carried out approximately at the same time. Each of the image processing modules 152A, 152B and 152C holds the information notified from the processing step determination part 151.

The memory information includes information indicating a location (or input address) in the storage part 16 (image memory 161) from where the image data which is the processing target is to be acquired, and information indicating a location (or output address) in the storage part 16 (image memory 161) to where the image data which is the processed result is to be output. The processing sequence information includes information indicating the order of the image processing modules in the executing sequence, and information for identifying the image processing modules positioned before and after each image processing module in the executing sequence. The link method information includes information for identifying a synchronizing timing of the image processing module which is executed before the image processing module which is to be linked and the image processing module which is to be linked. More particularly, the link method information includes information indicating the extent (for example, how many lines or the entire data) to which the image processing module, executed before the image processing module which is to be linked, has to output the image data by the time when the execution of the image processing module which is to be linked is started.

Next, the processing step determination part 151 judges the image processing module which is to be executed first based on the image processing control information, and requests the start of the processing with respect to the target image processing module (step S10). For example, the target image processing module is the image processing module 152A. The image processing module 152A which receives the request to start the processing acquires (or receives) the input image data from the input address specified by the memory information (step S11). Of course, the processing step determination part 151 prestores the input image data at the input address of the image processing module which is executed first. Then, the image processing module 152A executes an image processing unique to the image processing module 152A, and outputs (or sends) the output image data which is generated as a result of this image processing to the output address specified by the memory information (step S12).

Figure 6:
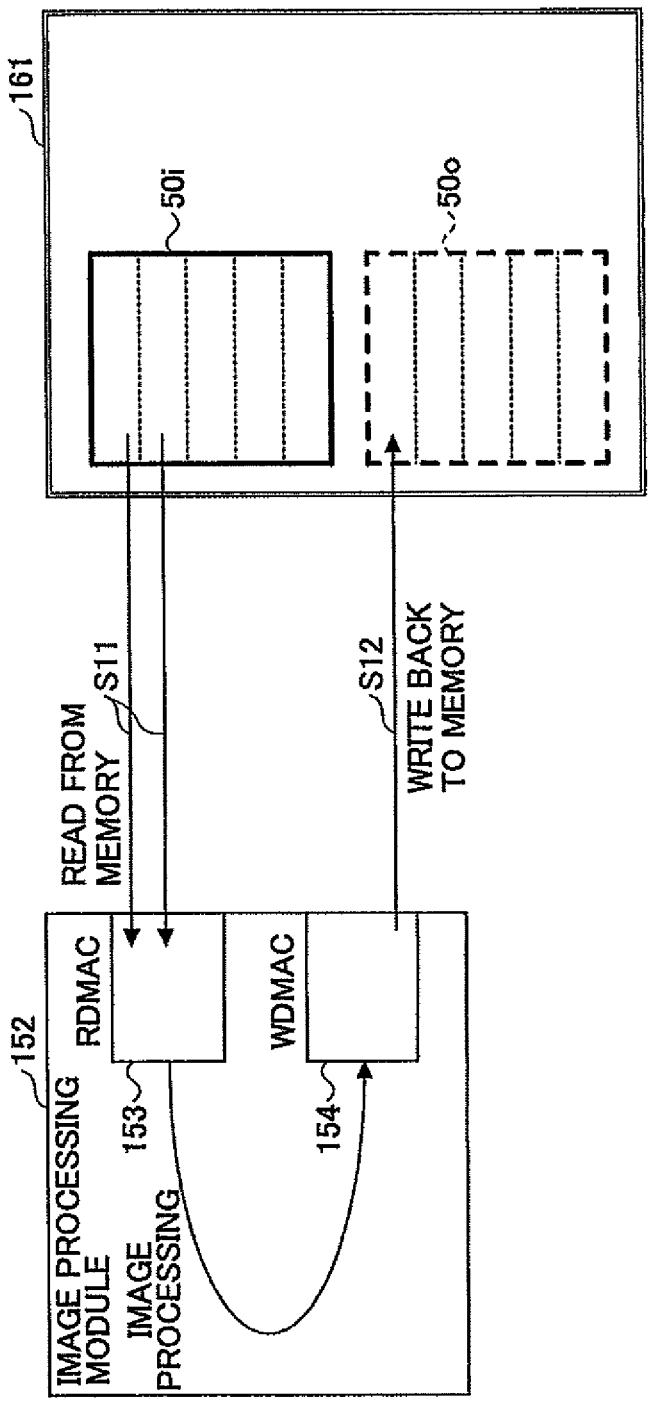
FIG. 6 is a diagram showing a transfer state of image data between an image processing module and an image memory.

Processing contents of the steps S11 and S12 are shown in FIG. 6. FIG. 6 is a diagram showing a transfer state of the image data between the image processing module and the image memory 161. In FIG. 6, those steps that are the same as those corresponding steps in FIG. 5 are designated by the same reference numerals.

As shown in FIG. 6, each image processing module 152 includes a Read Direct Memory Access Controller (RDMAC) 153 which receives the image data from the image memory 161, and a Write Direct Memory Access Controller (WDMAC) 154 which sends the image data to the image memory 161. The image processing module 152 receives image data 50i from the input address of the image memory 161 by the RDMAC 153, and carries out an image processing with respect to the image data 50i. The image processing module 152 sends image data 50o generated as a result of the image processing to the output address of the image memory 161 by the WDMAC 154. The input address and the output address of the image memory 161 may be the same address. In this case, a region where the image data 50i is stored in the image memory 161 is overwritten by the image data 50o.

In the case shown in FIG. 6, the image data 50i is divided (or segmented) into five bands, and the image processing is executed in units of bands. Hence, the unit of the image processing by the image processing module 152 does not necessarily have to be the entire image data that is processed in one image processing, and the image data may be divided into predetermined units (for example, a predetermined number of lines) and processed by the image processing in the predetermined units (hereinafter referred to as "processing units"). In other words, the image data may be processed by the image processing for every processing unit of the image data.

The image processing module 152A generates an interrupt with respect to the image processing module 152B which is to be executed next, every time the result of the image processing in the processing units is output to the image memory 161 (step S13). In addition, the image processing module 152A judges the image processing module (in this case, the image processing module 152B) which is to be executed next, based on the processing sequence notified from the processing step determination part 151.

The image processing module 152B which receives the interrupt from the image processing module 152A executes processes of a procedure similar to that of the steps S11 through S13 described above. The input address notified with respect to the image processing module 152B matches the output address with respect to the image processing module 152A. Accordingly, the image processing module 152B acquires (or receives) the image data which has been subjected to the image processing in the image processing module 152A (step S14), as shown in FIG. 7.

Figure 7:
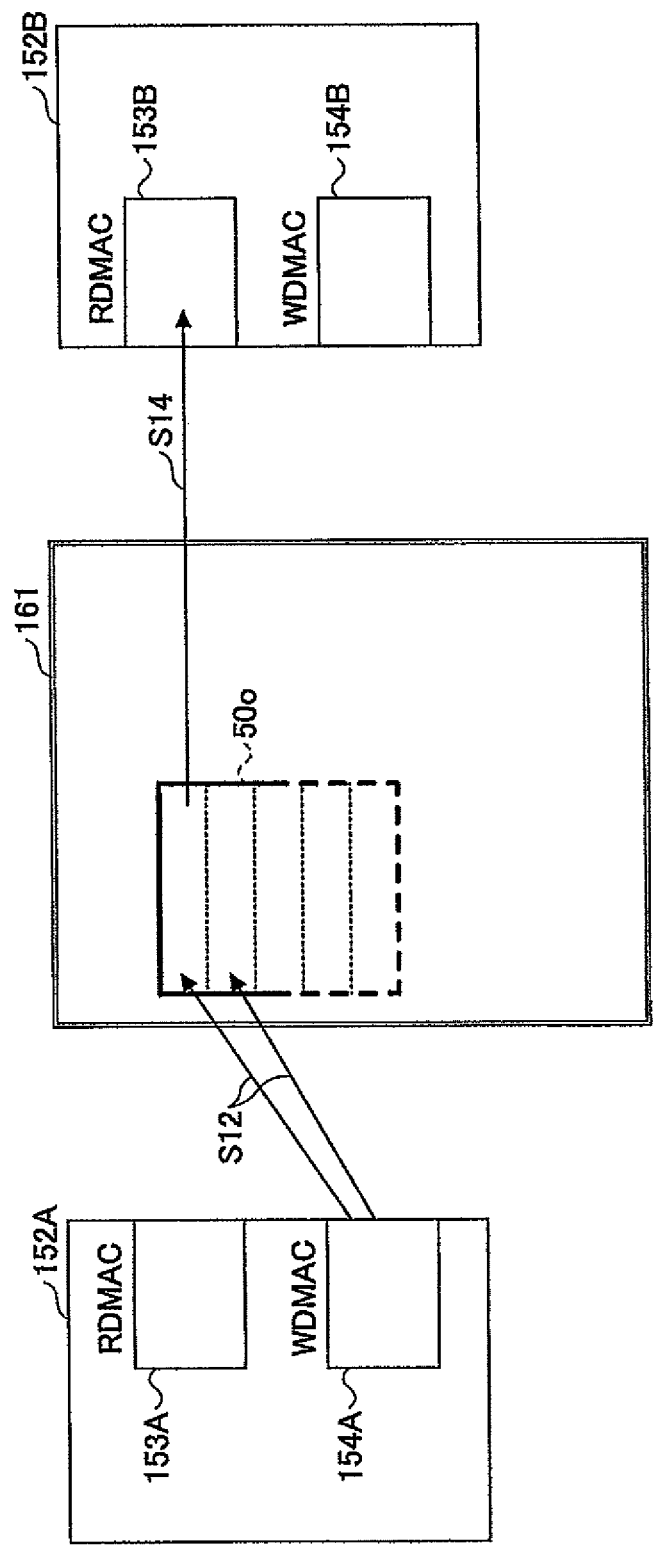
FIG. 7 is a diagram showing a transfer state of the image data via the image memory between successive image processing modules.

FIG. 7 is a diagram showing a transfer state of the image data via the image memory 151 between the successive image processing modules 152A and 152B. In FIG. 7, those parts that are the same as those corresponding parts in FIGS. 5 and 6 are designated by the same reference numerals.

When the image data 50o which has been subjected to the image processing in the image processing module 152A is sent to the output address of the image memory 161 (step S12), an interrupt is generated with respect to the image processing module 152B. In response to this interrupt, the image processing module 152B receives the image data 50o from the input address of the image memory 161 (that is, the output address of the image processing module 152A) and carries out the image processing with respect to the image data 50o (step S14).

However, if all of the image data subjected to the image processing in the image processing module 152A were sent to the image memory 161 before the image processing module 152B receives the image data from the image memory 161 and subjects the image data to the image processing, it would take an extremely long time to carry out the image processing. Hence, the image processing module 152B starts to receive the image data from the image memory 161 at a point in time when a predetermined amount of the image data (that is, image data in the processing units) has been sent from the image processing module 152A to the image memory 161. For example, the two image processing modules 152A and 152B send the image data to and receive the image data from the image memory 161 in units of lines. In FIG. 7, the sending and receiving of the image data are made in units of one line, where one line of the image data extends in a horizontal direction from the left to right.

When the processing speeds (or processing rates) of the image processing modules 152 are different, it is undesirable for the amount of the image data received from the image memory 161 by the image processing module 152B in the subsequent stage to exceed the amount of the image data sent to the image memory 161 from the image processing module 152A in the preceding stage. For this reason, the predetermined amount of the image data sent from the image processing module 152A in the preceding stage to the image memory 161, which determines the timing when the reception of the image data by the image processing module 152B in the subsequent stage from the image memory 161 starts, is preferably adjustable.

In this embodiment, the adjusting of the predetermined amount of the image data, that is, the adjusting of the timing when the reception of the image data by the image processing module 152B in the subsequent stage starts, is automatically made by the processing step determination part 151. A result of this adjustment is notified from the processing step determination part 151, as the "link method information", to each of the image processing modules 152A and 152B. The image processing module 152B in the subsequent stage judges the process start timing based on the "link method information". The "link method information" may be the number of lines read from the image memory 161 when one interrupt is notified. In this case, the image processing module 152B in the subsequent stage reads the number of lines specified by the "link method information" from the image memory 161 every time the interrupt is notified thereto, and executes the image processing amounting to the number of lines read. On the other hand, the number of lines read from the image memory 161 may be fixed to a predetermined number of lines, and the "link method information" may be the number of interrupts notified until the reading of the image data from the image memory 161 starts. In this case, the image processing module 152B in the subsequent stage reads the predetermined number of lines from the image memory 161 every time the number of interrupts notified thereto reaches a predetermined value specified by the "link method information", and executes the image processing amounting to the predetermined number of lines read.

A synchronization control similar to that described above may also be carried out between the image input accepting part 12 and the image processing part 15, and between the image processing part 15 and the image output part 13. In the first case, the image processing part 15 can start the image processing before the image input accepting part 12 completes sending all of the image data to the image memory 161. Further, in the latter case, the image output part 13 can start outputting the image data before the image processing part 15 completes sending all of the image data, which have been subjected to the image processing in the image processing part 15, to the image memory 161.

Returning now to the description of FIG. 5, the image processing module 152B generates an interrupt with respect to the image processing module 152C which is to be executed next, every time the result of the image processing amounting to the processing unit is output to the image memory 161 (step S16). The image processing module 152C which receives the interrupt executes processes of a procedure similar to that of the steps S11 through S13 described above. In other words, the image processing module 152C acquires (or receives) the image data, which have been subjected to the image processing in the image processing module 152B, from the image memory 161 (step S17). In this state, the amount of data (or processing unit) acquired is in accordance with the amount of data notified by the "link method information". Next, the image processing module 152C executes an image processing unique to the image processing module 152C, and outputs (or sends) the result of this image processing to the image memory 161 (step S18).

When all of the necessary image processings are completed, the system control part 11 requests output of the image data to the image output part 13 (step S19). The image output part 13 acquires (or receives) the image data, that is, the result of the image processing in the image processing module 152C, from the image memory 161, and outputs the image data to the image data output destination such as the facsimile apparatus 22, the PC 23 and the plotter 24 (step S20).

Figure 8:
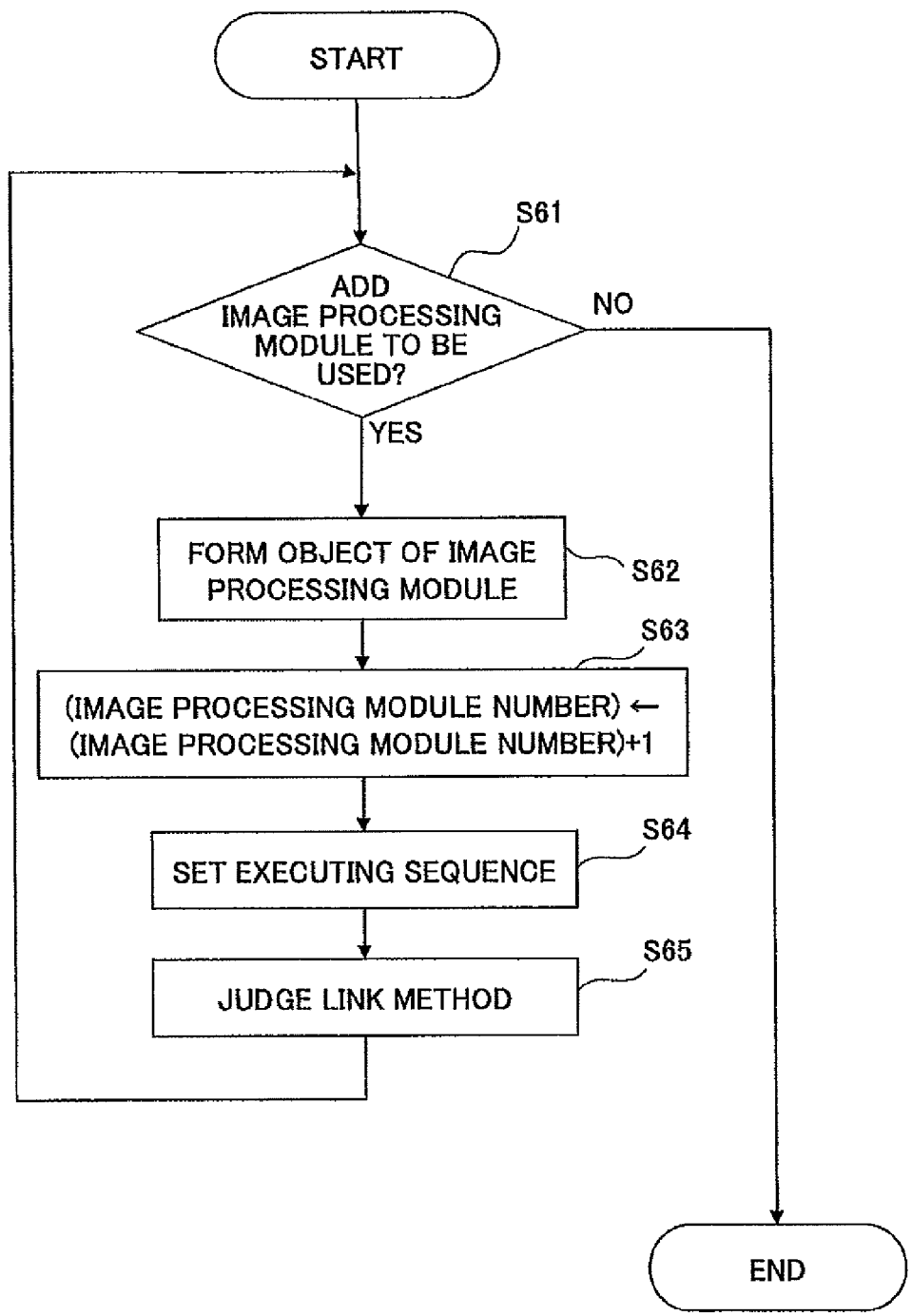
FIG. 8 is a flow chart for explaining a generating process of the processing step determination part, which generates image processing control information.

Next, a more detailed description will be given of the processing contents of the processing step determination part 151 in the step S6 shown in FIG. 5, by referring to FIG. 8. FIG. 8 is a flow chart for explaining a generating process of the processing step determination part 151, which generates image processing control information. The process shown in FIG. 8 is implemented in the processing step class 1511. Accordingly, the process shown in FIG. 8 is executed by the processing step object 1511A.

First, a judgement is made to determine whether or not it is necessary to add an image processing module which is to be used depending on the image processing parameters (step S61). This judgement is made using a priority table shown in FIG. 9.

Figure 9:
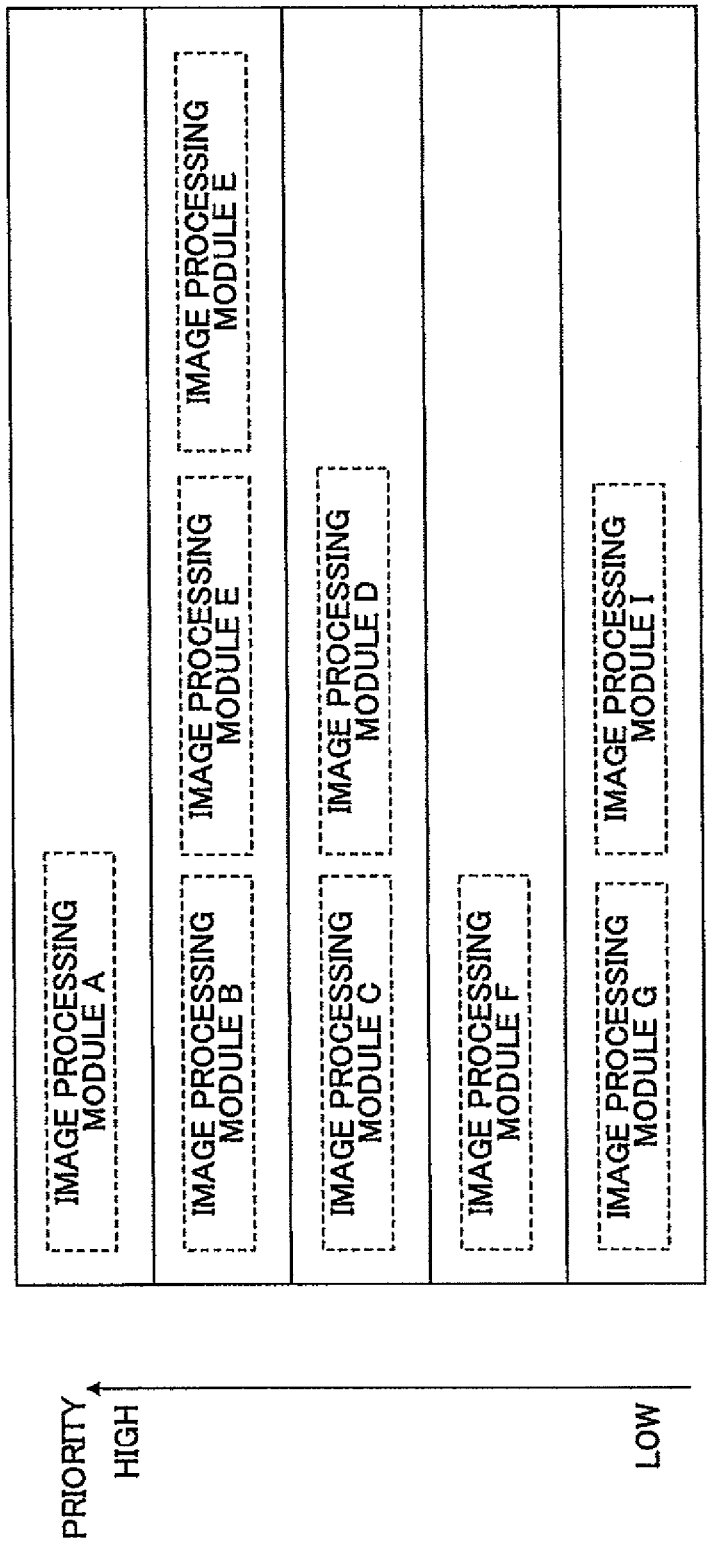
FIG. 9 is a diagram showing a priority table.

FIG. 9 is a diagram showing the priority table. The priority table shown in FIG. 9 defines priorities of the executing sequence of the image processing modules, as information indicating restrictions (or limitations) related to the executing sequence of each of the image processing modules. In FIG. 9, the image processing module indicated in the top row has the highest priority, and the image processing modules indicated in the rows below have lower priorities towards the bottom row.

Restrictions may be added to the executing sequence of the image processings that are carried out by the image processing modules. For example, when carrying out an expansion process and a magnification process with respect to compressed image data, the expansion process (expanding part 1522) must be executed before the magnification process (spatial processing part 1523). The image processing modules having the same priority in FIG. 9, such as the image processing modules C and D indicated in the same row of the priority table, have no difference in the order in the processing sequence. In other words, the result of the image processings is the same regardless of which one of the image processing modules is executed before another among the image processing modules having the same priority. In the case of the image processing modules C and D having the same priority in FIG. 9, the result of the image processings is the same regardless of whether the image processing module C is executed before the image processing module D or, the image processing module D is executed before the image processing module C. The priority table may be stored in the storage part 16, such as the HDD 162 or, in any suitable storage unit within the image processing apparatus 10. Alternatively, the priority table may be stored in a storage unit which externally is connected to the image processing apparatus 10 via the network 20, for example.

Then, the step S61 judges whether or not to it is necessary to add an image processing module which is to be used, based on the image processing parameters, in the order of the image processing modules defined in the priority table. If it is judged necessary to add one image processing module depending on the image processing parameters (YES in step S61), the instance of the image processing module object (hereinafter referred to as "current image processing module object") corresponding to this one image processing module (hereinafter referred to as "current image processing module") is generated (step S62). A value indicating the type of the current image processing module (for example, "expand" in the case of the expanding part 1522) is set in the "type" attribute of the current image processing module object that is generated. Thereafter, a value "1" is added to the value of the "image processing module number" of the processing step object, and the current image processing module object is registered with respect to the processing step object, to form the relation r1 between the processing step object and the current image processing module object (step S63).

Next, an executing sequence is set with respect to the image processing module object (step S64). If the current image processing module object is the first image processing module object, the value "1" is set to the "sequence" attribute of the current image processing module object. On the other hand, if the image processing module object is the second or subsequent image processing module object, the order of the image processing module object is set in the "sequence" attribute of the current image processing module object, and a relation r2 is formed between the current image processing module object and the image processing module object in the stage preceding the current image processing module object.

Then, the link method of the image processing module object is judged (step S65). The link method may be judged by use of a processing speed table shown in FIG. 10 which defines a relationship of the processing speeds (or processing rates) of the image processing modules.

Figure 10:
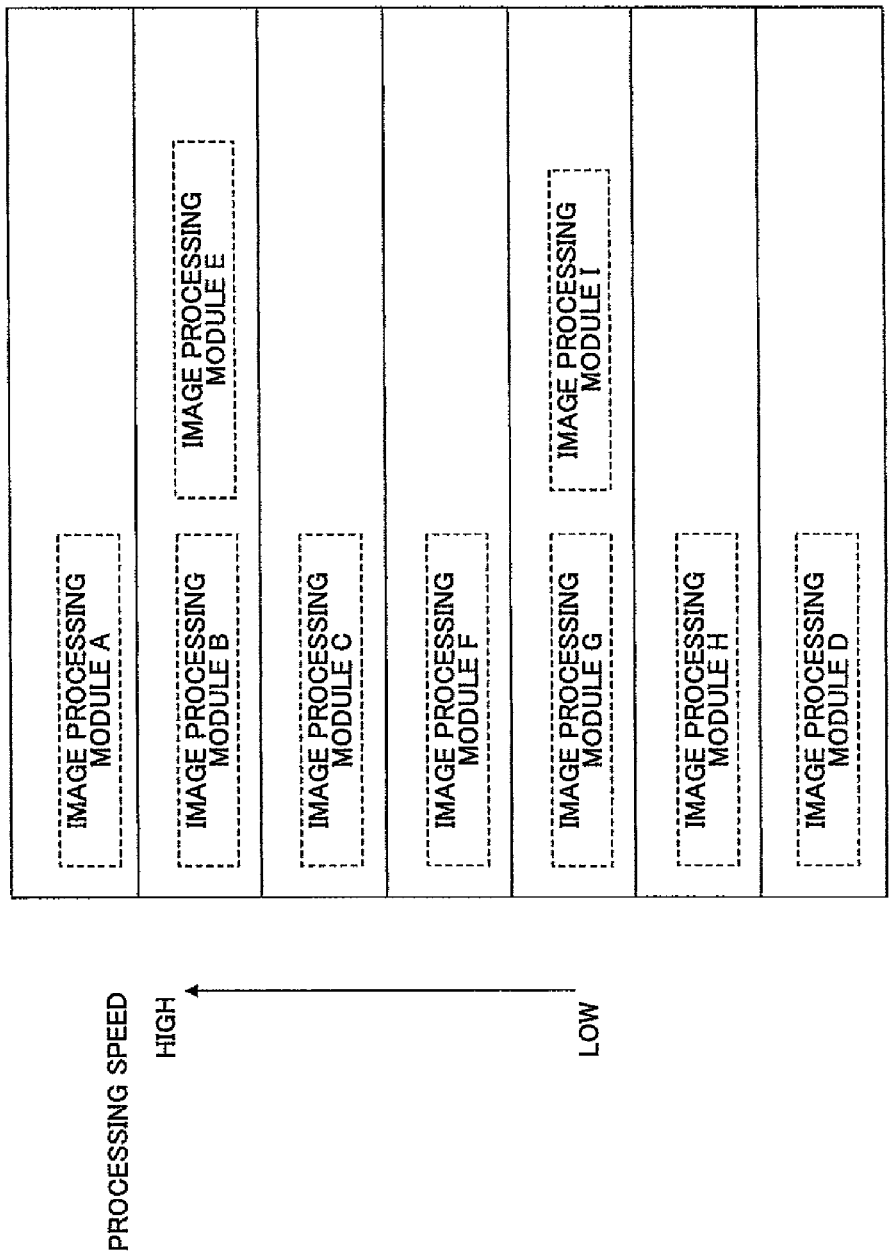
FIG. 10 is a diagram showing a processing speed table.

FIG. 10 is a diagram showing the processing speed table. The processing speed table shown in FIG. 10 defines processing speeds of the image processing modules. In FIG. 9, the image processing module (or identification information of the image processing module) indicated in the top row has the highest processing speed, and the image processing modules indicated in the rows below have lower processing speeds towards the bottom row. The image processing modules having the same processing speed in FIG. 10, such as the image processing modules G and I, are indicated on the same row of the processing speed table.

For example, if the step S65 judges that the processing speed of the current image processing module is higher than the processing speed of the image processing module object which is executed in the stage preceding the current image processing module (that is, the image processing module corresponding to the image processing module object having the role name "before" in the relation r2 relating this image processing module object to the current image processing module object), a value indicating the start of the image processing by the current image processing module is set to the "link method" attribute of the current image processing module object after the image processing module in the preceding stage completes all of the image processing. Alternatively, an amount of delay (or processing unit) which does not exceed the amount of image data processed by the current image processing module is determined before the image processing of the image processing module in the preceding stage is completed, even if the current image processing module starts the image processing thereof, and the determined processing unit is set to the "link method" attribute of the current image processing module object. In this latter case, information indicating an absolute value or a relative value (for example, processing speed ratio) of each image processing module may be managed for every image processing module object in the processing speed table or, managed for every group (corresponding to each row in FIG. 10) in a case where the image processing module objects are grouped depending on the processing speed, and the processing unit may be determined based on the absolute value or the relative value of the processing speed. The processing speed table may be stored in the storage part 16, such as the HDD 162 or, in any suitable storage unit within the image processing apparatus 10, such as the HDD 162. Alternatively, the priority table may be stored in a storage unit which is externally connected to the image processing apparatus 10 via the network 20, for example.

After the step S65, the process returns to the step S61. Hence, an image processing module positioned next in the priority table with respect to the image processing module which was previously selected as being necessary is set as the current image processing module, and the processes of the steps S62 through S65 described above are repeated. As a result, the relating by the relation r2 of the image processing module object (that is, the executing order of the image processing modules that are used) is made according to the order of priority in the priority table, that is, in a state where the restrictions of the executing sequence are satisfied. When the judgement in the step S61 is completed with respect to all of the image processing modules in the priority table (NO in step S61), the process shown in FIG. 8 ends. The object structure shown in FIG. 4, namely, the image processing control information, is formed when the process shown in FIG. 8 ends.

As described above, according to the image processing apparatus 10 of this embodiment, it is possible to dynamically determine the image processing modules which are to be used, from among the plurality of image processing modules, depending on the image processing parameters (or image processing conditions) when executing the image processing.

In addition, it is also possible to dynamically determine the executing order of the image processing modules which are used. Hence, the image processing can be carried out efficiently by using only the minimum required number of image processing modules. In addition, it is possible to realize a highly flexible image processing because the executing sequence of the image processing module is variable.

Moreover, each image processing module does not directly exchange the image data, but sends and receives (or transfers) the image data via the image memory. For this reason, each image processing module does not need to be aware of the interfaces of the other image processing modules. In other words, the independence of each image processing module is maintained. Consequently, it is possible to flexibly rearrange the combination of the image processing modules which are necessary to execute the image processing.

Furthermore, when carrying out the image processing using a plurality of image processing modules, the image processing module located in the subsequent stage in the order of the executing sequence starts to receive the image data from the image memory at a point in time when the amount of image data sent from the image processing module located in the preceding stage in the order of the executing sequence to the image memory reaches a predetermined amount, where the predetermined amount is a portion of the entire image data sent from the image processing module located in the preceding stage. As a result, it is possible to execute the image processing at a high speed.

In addition, the image processing apparatus 10 of this embodiment determines the image processing modules which are to be used, for every image processing request. Thus, the image processing modules which are not used are in a usable state when the image processing part 15 receives another image processing request, and it is possible to carry out image processings in parallel.

For example, the output image data that is generated differs between a case where the image data is subjected to a magnification process before being subjected to a synthesizing process and a case where the image data is subjected to a synthesizing process before being subjected to a magnification process. However, because the processing sequence of the image processing modules is determined for every operation, it is also possible to flexibly cope with or manage such an image processing request which is a combination of image processings which need to be executed in a certain sequence.

Next, a description will be given of particular examples of the executing sequence (or connection relationship) of the image processing modules which become possible by the image processing apparatus 10 of this embodiment, by referring to FIGS. 11 through 14.

Figure 11:
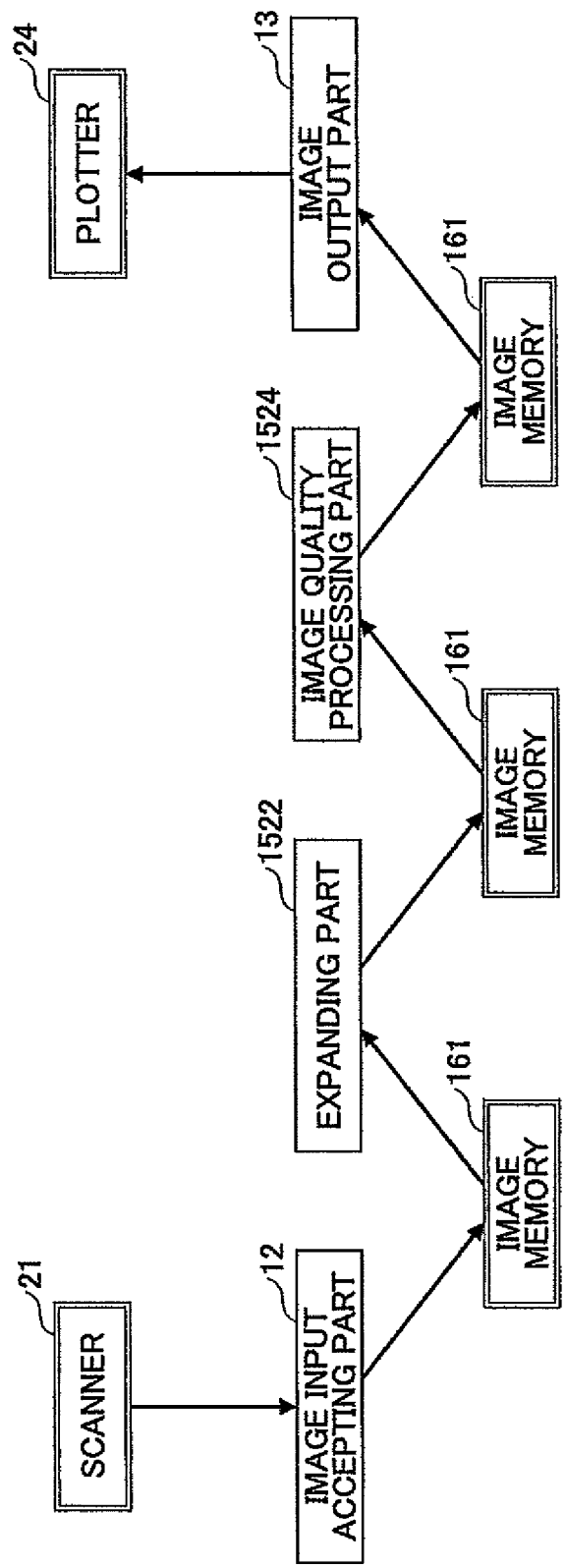
FIG. 11 is a diagram showing a first example of the processing sequence of the image processing modules.

FIG. 11 is a diagram showing a first example of the processing sequence of the image processing modules. FIG. 11 shows the executing sequence of the image processing modules when it is necessary to carry out an expansion and an image quality processing, in a case where the scanner 21 is set as the image data input source and the plotter 24 is set as the image data output destination.

In the case shown in FIG. 11, the image data accepted by the image input accepting part 12 may be compressed in order to reduce the storage capacity required to store the image data. If so, the image data is first subjected to an expansion in the image processing apparatus 10 before being subjected to the image quality processing for the plotter output. More particularly, the expanding part 1522 receives from the image memory 161 the image data which was transmitted from the image input accepting part 12 to the image memory 161, and expands the received image data. In this state, the expanding part 1522 starts receiving the image data from the image memory 161 before the image input accepting part 12 completes sending all of the image data to the image memory 161. The expanding part 1522 successively sends the expanded image data to the image memory 161. Similarly, the image quality processing part 1524 in the subsequent stage starts receiving the image data from the image memory 161 before the expanding part 1522 completes sending all of the image data to the image memory 161. Further, the image output part 13 starts receiving the image data from the image memory 161 before the image processing part 15 completes sending all of the image data to the image memory 161.

Figure 12:
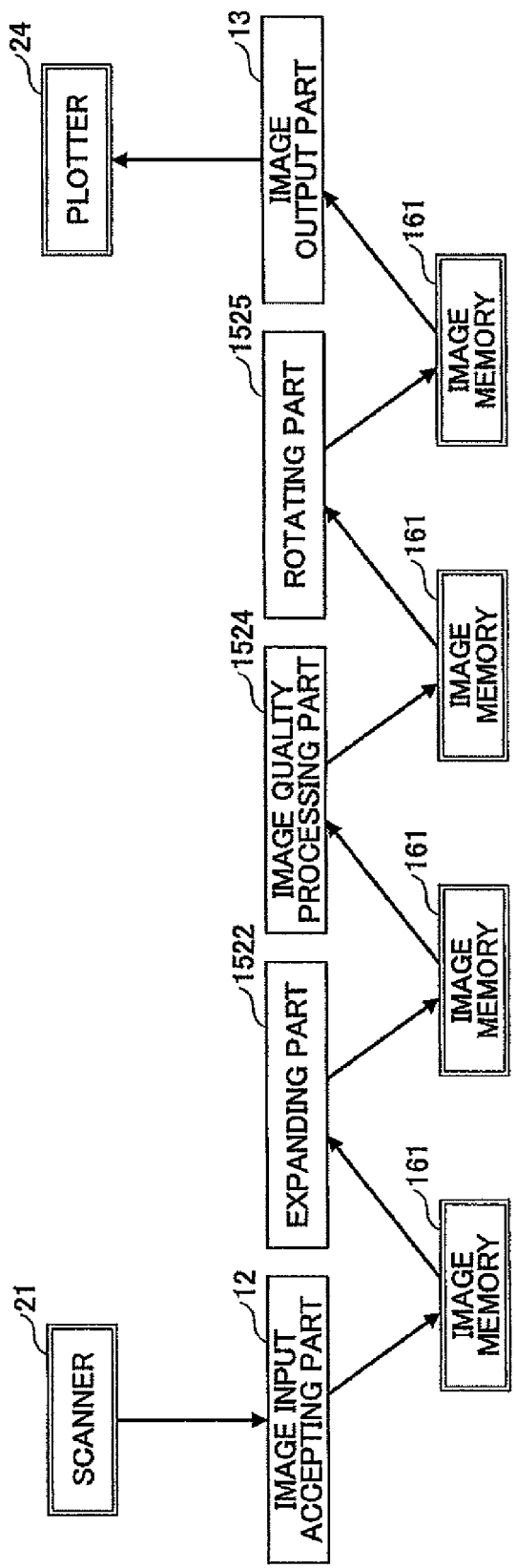
FIG. 12 is a diagram showing a second example of the processing sequence of the image processing modules.

FIG. 12 is a diagram showing a second example of the processing sequence of the image processing modules. FIG. 12 shows a case where the image processing apparatus 10 of this embodiment can arbitrarily select the image processing modules which are to be used. Accordingly, when it is judged based on the image processing parameters that a rotation is necessary, a rotation (rotating part 1525) can be added with respect to the executing sequence shown in FIG. 11.

Figure 13:
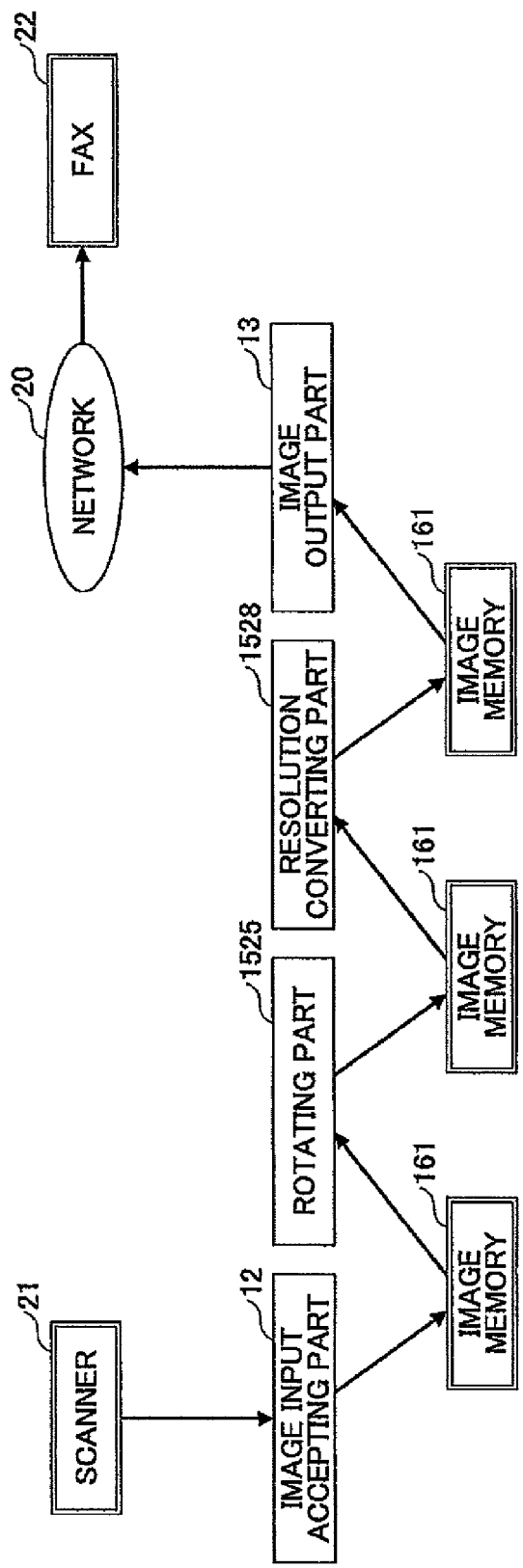
FIG. 13 is a diagram showing a third example of the processing sequence of the image processing modules.

FIG. 13 is a diagram showing a third example of the processing sequence of the image processing modules. FIG. 13 shows the executing sequence of the image processing modules when it is necessary to carry out a rotation and a resolution conversion, in a case where the scanner 21 is set as the image data input source and the facsimile apparatus 22 is set as the image data output destination. When the facsimile apparatus 22 or the like is used as the output destination, the image direction and the resolution may be adjusted to match or suit the specifications of the image data output destination.

FIG. 14 is a diagram showing a fourth example of the processing sequence of the image processing modules. FIG. 14 shows the executing sequence of the image processing modules when it is necessary to carry out an expansion and an image quality processing, in a case where the input image data is the image data which is accepted by the image input accepting part 12 and is saved (or stored) as reusable image data (or backup image data) in the HDD 162, for example. In other words; if the plotter 24 is unable to output the image data due to a failure or, only the image data input is made independently, for example, this fourth example carries out the image processing by use of the image data saved in the HDD 162. The saved image data is transferred from the HDD 162 to the image memory 161, and the image processing module carries out the image processing by receiving the image data from the image memory 161. Thereafter, a process similar to that for the case shown in FIG. 11 is carried out.

In the embodiment described above, the image processing modules correspond to or, form processing parts. In addition, the processing step determination part 151 corresponds to or, forms an executing sequence determination part (or means).

This application claims the benefit of a Japanese Patent Application No. 2007-177508 filed Jul. 5, 2007, in the Japanese Patent Office, the disclosure of which is hereby incorporated by reference.

Further, the present invention is not limited to these embodiments, but various variations and modifications may be made without departing from the scope of the present invention.

What is claimed is:

1. An image processing apparatus comprising:
a plurality of processing parts configured to execute different processes with respect to image data;
a storage part configured to store information indicating priorities of an executing sequence of the plurality of processing parts;
a selecting part configured to select two or more processing parts to be utilized from amongst the plurality of processing parts, based on conditions related to a requested image processing; and
an executing sequence determination part configured to determine the executing sequence of the two or more processing parts selected by the selecting part, based on the priorities of the executing sequence indicated by the information stored in the storage part,
wherein the two or more processing parts selected by the selecting part are executed according to the executing sequence determined by the executing sequence determination part,
wherein, amongst the two or more processing parts, a first processing part to be executed before one or more other processing parts in the executing sequence determined by the executing sequence determination part stores, in a storage unit, image data of a processed result of the first processing part, and a second processing part to be executed after the first processing part in the executing sequence determined by the executing sequence determination part acquires, from the storage unit, image data of a processing target to be processed by the second processing part, and
wherein the second processing part starts to acquire the image data of the processing target from the storage unit at a timing determined based on information that is stored in the storage unit and indicates a relationship of processing speeds of the plurality of processing parts.

2. The information processing apparatus as claimed in claim 1, wherein the second processing part starts to acquire the image data of the processing target from the storage unit when the first processing part stores, in the storage unit, an amount of image data determined based on the information indicating the relationship of the processing speeds of the plurality of processing parts.

3. The information processing apparatus as claimed in claim 1, wherein the second processing part starts to acquire the image data of the processing target from the storage unit when a number of notifications, indicating storage of the image data of the processed result of the first processing part into the storage unit, reaches a number determined based on the information indicating the relationship of the processing speeds of the plurality of processing parts.

4. An image processing control method to be implemented in an image processing apparatus having a plurality of processing parts configured to execute different processes with respect to image data, said image processing control method comprising:
a selecting procedure to select two or more processing parts to be utilized from amongst the plurality of processing parts, based on conditions related to a requested image processing; and
an executing sequence determination procedure to determine an executing sequence of the two or more processing parts selected by the selecting procedure, based on priorities of an executing sequence indicated by information stored in a storage part,
wherein the two or more processing parts selected by the selecting procedure are executed according to the executing sequence determined by the executing sequence determination procedure,
wherein, amongst the two or more processing parts, a first processing part to be executed before one or more other processing parts in the executing sequence determined by the executing sequence determination procedure stores, in a storage unit, image data of a processed result of the first processing part, and a second processing part to be executed after the first processing part in the executing sequence determined by the executing sequence determination procedure acquires, from the storage unit image data of a processing target to be processed by the second processing part, and wherein the second processing part starts to acquire the image data of the processing target from the storage unit at a timing determined based on information that is stored in the storage unit and indicates a relationship of processing speeds of the plurality of processing parts.

5. The information processing control method as claimed in claim 4, wherein the second processing part starts to acquire the image data of the processing target from the storage unit when the first processing part stores, in the storage unit, an amount of image data determined based on the information indicating the relationship of the processing speeds of the plurality of processing parts.

6. The information processing control method as claimed in claim 4, wherein the second processing part starts to acquire the image data of the processing target from the storage unit when a number of notifications, indicating storage of the image data generated as the processed result of the first processing part into the storage unit, reaches a number determined based on the information indicating the relationship of the processing speeds of the plurality of processing parts.

7. A non-transitory computer-readable storage medium that stores a program which, when executed by a computer, causes the computer to perform a process of an image processing apparatus having a plurality of processing parts configured to execute different processes with respect to image data, said process comprising:
   a selecting procedure causing the computer to select two or more processing parts to be utilized from amongst the plurality of processing parts, based on conditions related to a requested image processing; and
   an executing sequence determination procedure causing the computer to determine an executing sequence of the two or more processing parts selected by the selecting procedure, based on priorities of an executing sequence indicated by information stored in a storage part,
   wherein the two or more processing parts selected by the selecting procedure are executed according to the executing sequence determined by the executing sequence determination procedure,
   wherein, amongst the two or more processing parts, a first processing part to be executed before one or more other processing parts in the executing sequence determined by the executing sequence determination procedure stores, in a storage unit, image data of a processed result of the first processing part, and a second processing part to be executed after the first processing part in the executing sequence determined by the executing sequence determination procedure acquires, from the storage unit, image data of a processing target to be processed by the second processing part, and
   wherein the second processing part starts to acquire the image data of the processing target from the storage unit at a timing determined based on information that is stored in the storage unit and indicates a relationship of processing speeds of the plurality of processing parts.

8. The non-transitory computer-readable storage medium as claimed in claim 7, wherein the second processing part starts to acquire the image data of the processing target from the storage unit when the first processing part stores, in the storage unit, an amount of image data determined based on the information indicating the relationship of the processing speeds of the plurality of processing parts.

9. The non-transitory computer-readable storage medium as claimed in claim 7, wherein the second processing part starts to acquire the image data of the processing target from the storage unit when a number of notifications, indicating storage of the image data generated as the processed result of the first processing part into the storage unit, reaches a number determined based on the information indicating the relationship of the processing speeds of the plurality of processing parts.

10. The image processing apparatus as claimed in claim 1,
    wherein the information stored in the storage unit includes a table that defines the processing speeds of the plurality of processing parts, and
    wherein each row of the table corresponds to a certain processing speed and includes identification information identifying each processing part having the certain processing speed, and a position of one row is higher or lower relative to another row in the table depending on whether a processing speed corresponding to the one row is higher or lower relative to a processing speed corresponding to the other row in the table.

11. The image processing control method as claimed in claim 4,
    wherein the information stored in the storage unit includes a table that defines the processing speeds of the plurality of processing parts, and
    wherein each row of the table corresponds to a certain processing speed and includes identification information identifying each processing part having the certain processing speed, and a position of one row is higher or lower relative to another row in the table depending on whether a processing speed corresponding to the one row is higher or lower relative to a processing speed corresponding to the other row in the table.

12. The non-transitory computer-readable storage medium as claimed in claim 7,
    wherein the information stored in the storage unit includes a table that defines the processing speeds of the plurality of processing parts, and
    wherein each row of the table corresponds to a certain processing speed and includes identification information identifying each processing part having the certain processing speed, and a position of one row is higher or lower relative to another row in the table depending on whether a processing speed corresponding to the one row is higher or lower relative to a processing speed corresponding to the other row in the table.

* * * * *